UNITED STATES PATENT OFFICE.

GEORGE S. EVANS, OF NEW YORK, N. Y.

PLASTIC COMPOSITION AND VULCANITE.

SPECIFICATION forming part of Letters Patent No. 256,470, dated April 18, 1882.

Application filed September 16, 1881. (Specimens.)

*To all whom it may concern:*

Be it known that I, GEORGE S. EVANS, a citizen of the United States, residing at New York, in the county of New York and State of New York, have invented certain new and useful Improvements in Plastic Compositions and Vulcanites, of which the following is a specification.

The objects of my invention are to render gums—such as gum-kauri or gum-manila—plastic, and also to make vulcanites from them.

My invention consists, generally, in making a plastic material from gums by mixing with them palm-oil and then heating the mixture, and also in vulcanizing gums by treating the plastic material formed according to known methods of vulcanization, or according to a new method hereinafter described.

My invention consists particularly in making vulcanites from gums by proceedings hereinafter described.

One method by which my invention is carried into effect is to mix gum-kauri or any of the Manila gums with palm-oil in about the proportion of two or three of the gum to one of the palm-oil, the proportion of oil being increased generally according to the hardness of the gum. The mixture is then melted and slowly heated to about 400° Fahrenheit (with suitable stirring to prevent burning) for a period of from three-quarters of an hour to an hour and a half, or until the mixture becomes clear and limpid—the longer the heating the better being the result. Should the mixture begin to froth, the heat should be reduced. The finished mixture may be used for the various purposes for which plastic materials are used in the arts. After the mixture has been sufficiently cooked it may at once be vulcanized, either in the ordinary way or by having alumina added to it in the proportion of about one-sixteenth the weight of the mixture, the alumina being added gradually, and care being taken thoroughly to incorporate it with the mixture, after which about one to one and a half per cent. of sulphur, or its equivalent, is added, and the heat continued until a satisfactory vulcanite is obtained. I prefer, however, to let the mixture of gum and palm-oil cool after it is cooked, working in the alumina while it is in that condition, then melting the mixture, with suitable stirring, then allowing it to cool, then incorporating the sulphur or its equivalent, and, finally, heating to vulcanize. Alumina assists vulcanization, allowing gases produced by the vulcanizing substance to escape freely from the mixture during vulcanization.

It is obvious that the cooked mixture may be subsequently treated on heated plates, or have the alumina or sulphur, or both, suitably incorporated by passing through heated rollers, or by other common means. In all cases, if sufficient time be allowed, vulcanization can be effected by vulcanizing substances without heat.

My peculiar method of vulcanizing the suitably-cooked mixture of a gum and palm-oil is to incorporate with the plastic material, when cold, chloride of aluminium in the proportion of about one-eighth of one per cent., or more, of the chloride, according to the hardness of the vulcanite desired, and then heat the mixture to about 212° Fahrenheit on heated plates or in ovens, or otherwise—as by heated rollers—until suitably vulcanized, after which the vulcanite may be treated with hot water to remove any free chloride of aluminium present.

The plastic material and the chloride may be placed in a closed digester containing water, and be heated to the proper temperature with its corresponding steam-pressure until the desired vulcanization ensues, as will be understood by all persons skilled in vulcanizing rubber. The product will be a vulcanite of a light color, presumably better than vulcanite produced with a dry heat.

Instead of mixing the dry chloride of aluminium with the plastic material, the vulcanite can be made by heating the plastic material in a solution of the chloride.

The plastic material made by heating gums with palm-oil is readily soluble in turpentine and oils, and the solution may thus be applied to cloth or other fabrics to waterproof them, and may be vulcanized upon the material, if desired. The solution may also be used as a water-proof paint. Both the plastic material and the vulcanite produced from it are like rubber electric insulators. For electric insulating purposes the invention may be applied either in a condition of suitable vulcanization or as the plastic material subsequently to be vulcanized in its proper situation or not, as circumstances demand, by any of the well-known means—as by sulphur or iodine, with or without heat; or it may be vulcanized by my chloride-of-aluminium process above described.

When it is desirable to apply my invention for electric insulating purposes the wire or other conductor may of course be first covered with fibrous material, like cotton or silk; or the cotton or silk itself may be saturated with my insulating substance before being applied to the wire; and in these cases, also, the plastic material alone may be used to cover conductors such as are used for telegraphic, telephonic, and other purposes; or it may be applied to them as a vulcanite, or the plastic material may be applied to them and vulcanized afterward.

Having thus fully described my invention, what I claim is—

1. The process of making from gums—such as gum-kauri or gum-manila—a plastic material suitable for waterproofing or for vulcanization, which consists in mixing such gum with palm-oil and then heating the mixture, as set forth.

2. A plastic material capable of forming with a suitable solvent, like oil or turpentine, a waterproofing substance or capable of being vulcanized, consisting of a gum—such as gum-kauri or gum-manila—united or combined with palm-oil, substantially as and in the proportions described.

3. The process of vulcanizing gums—such as gum-kauri or gum-manila—which consists in rendering them plastic and then treating them with a vulcanizing substance, like sulphur or iodine.

4. A vulcanite in which a gum—such as gum-kauri or gum-manila—treated with palm-oil is united with a vulcanizing substance.

5. The method of vulcanizing substances, which consists in treating them with chloride of aluminium, substantially as described.

6. A vulcanite consisting of a suitable vulcanizable substance united or combined with chloride of aluminium.

7. The process of vulcanizing gums, which consists in rendering them plastic and then treating them with chloride of aluminium, as described.

8. The process of converting gums—such as gum-kauri or gum-manila—into a suitable vulcanite, which consists in making a plastic material of the gum by uniting it with palm-oil, then heating the mixture until sufficiently cooked, and then incorporating with it chloride of aluminium, either dry or wet, with or without heat, substantially as described.

In testimony whereof I affix my signature in presence of two witnesses.

GEORGE S. EVANS.

Witnesses:
D. P. COWL,
GEO. R. BYINGTON.